3,420,464
STRIP FILM ADAPTER
Karl Rudzitis, West Babylon, John Castellano, Commack, and Rudolph G. Wolz, Lake Ronkonkama, N.Y., assignors to Viewlex, Inc., Holbrook, N.Y.
Filed Sept. 23, 1965, Ser. No. 489,644
U.S. Cl. 242—71.1          3 Claims
Int. Cl. G03b 1/04

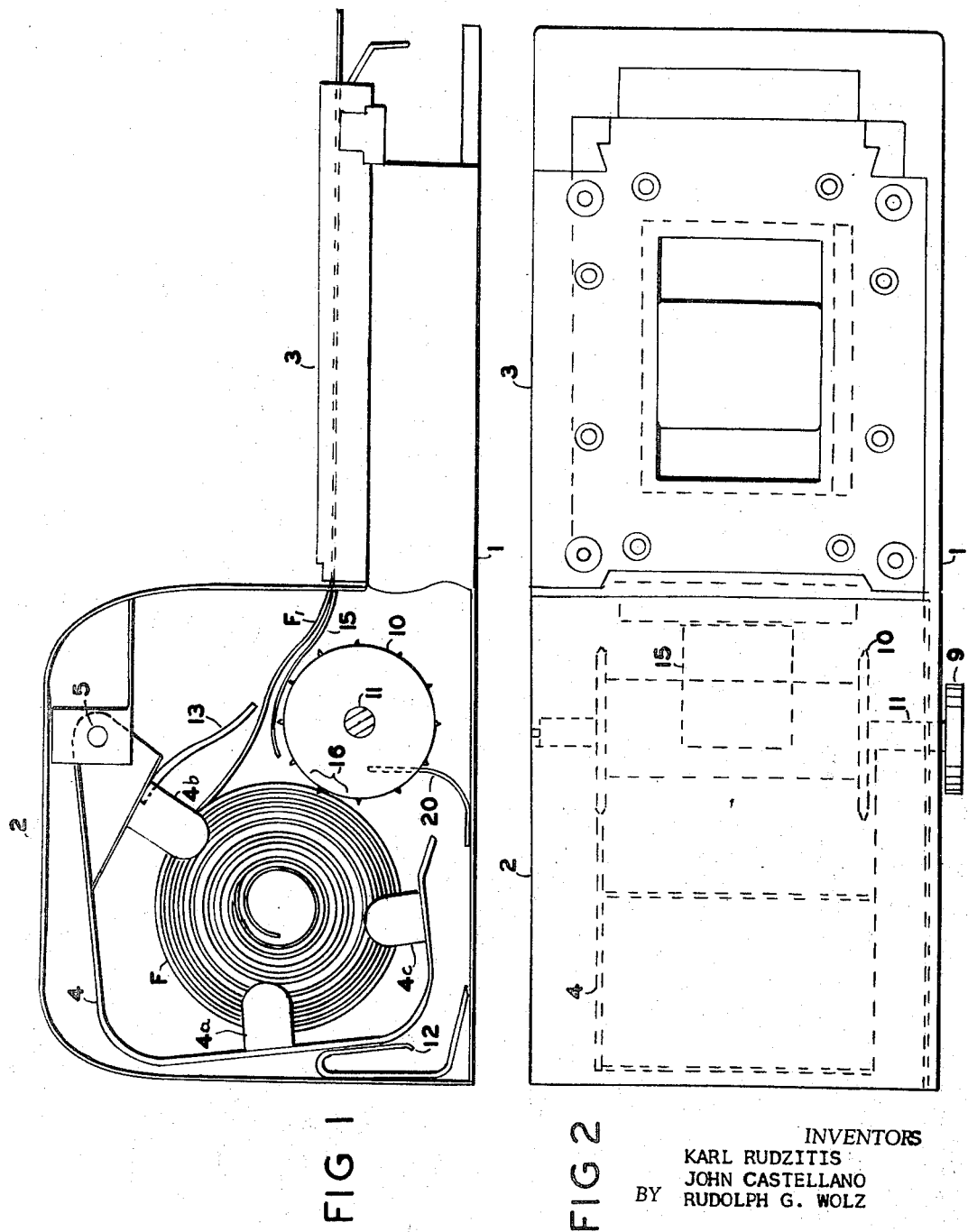

ABSTRACT OF THE DISCLOSURE

A self threading film roll adapter having a body member with film viewing and film feeding portions. A film holder is pivoted within the film feeding portion and is spring loaded to press the film roll against a sprocket. The sprocket pushes the film roll, within the feeding portion, past guides and into the viewing portion.

---

This invention relates to film strip feeding means and more particularly to self threading film roll adapters for use in slide projectors.

Strip film is commonly used for educational and other purposes and comes in rolls about ten feet long. These rolls are somewhat difficult to handle since they are so short that they are not adapted to be placed in reels as with longer film. Therefore, they are subject to much handling with the danger of finger marks and other damage.

The present invention provides an adapter in which a roll of strip film, for instance ten feet long, may be inserted. The adapter is self threading and feeds the film past a viewing position. After viewing the film is rewound.

More specifically the invention comprises a body member having a film viewing portion and a hollow film feeding portion, said film viewing portion being adapted to be inserted in a slide projector, a sprocket rotatably mounted in said body member, film holding means pivotally mounted in said film feeding portion of said body member and adapted to receive said film roll, means to spring load said film holding means to press said film roll against said sprocket, and guide means adapted to guide said film past said sprocket and into said viewing portion.

The invention also incorporates a removable strip film cartridge which has a large aperture on one side which is adapted to slip into the film holding means of the film adapter. When using the film cartridge, the film is not touched by the hands at all. The cartridge is merely slid into the adapter and the sprocket is turned and is self threading. The sprocket feeds the film into the viewing position which is mounted on the optical axis of the projector. After the complete film is used it is wound up in reversed direction into the cartridge and the cartridge is then removed for storage.

Accordingly, a principal object of the invention is to provide new and improved film feeding means.

Another object of the invention is to provide new and improved means for self threading roll film feeding means.

Another object of the invention is to provide a new and improved self threading adapter for feeding strip film in a slide projector.

Another object of the invention is to provide new and improved strip film adapter means to receive a removable cartridge holding the film.

Another object of the invention is to provide new and improved film cartridge means for strip film which is adapted to be inserted in a self threading feeding means.

These and other objects of the invention will be apparent from the following specification and drawings of which:

FIGURE 1 is a side view of an embodiment of the invention partly in section.

FIGURE 2 is a top view of the embodiment of FIGURE 1.

Figure 4:
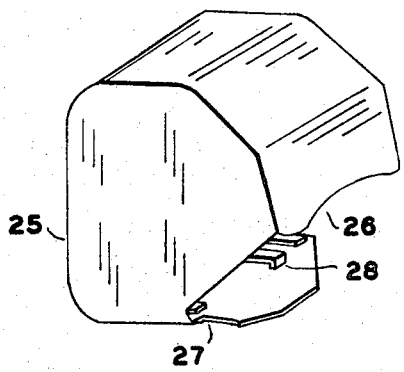
FIGURE 4 is a perspective view of a strip film cartridge.
Figure 3:
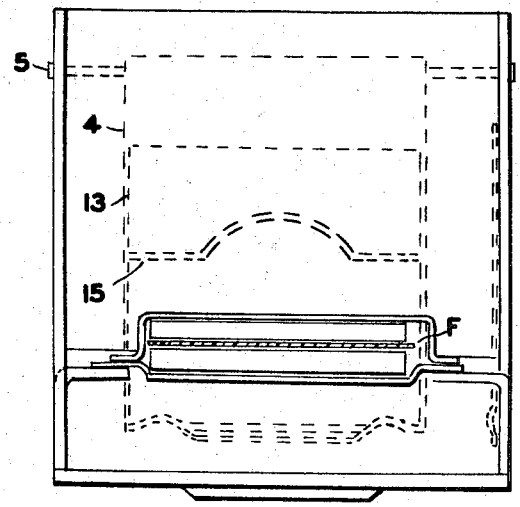
FIGURE 3 is a front view of an embodiment of FIGURE 1.

Referring to the figures, the invention generally comprises a body member 1 having a film feeding portion 2 and a film viewing portion 3. The film viewing portion 3 contains the conventional glass pressure plates and aperture mask and this portion is adapted to be inserted into the opening in a slide projector which normally receives the slide changing apparatus.

The film feeding portion is hollow and contains a pivotally mounted film holding frame 4 which is pivotally mounted by the pin 5. The frame 4 extends around adjacent the inner surface of the portion 2 and is adapted to receive within it the roll of strip film F. Sprocket 10 is rotatably mounted in the body member by the shaft 11 which preferably has a conventional indexing knob 9 so that the film may be properly advanced. The frame 4 is spring loaded by the spring 12 so that the roll of film F bears against the sprocket 10. When the sprocket is rotated counter-clockwise in FIGURE 1, the roll is rotated clockwise and the leading edge of the film is guided by means of guides 13 and 15 over the sprocket 10 into the viewing portion 3 where the film is viewed in the conventional manner.

The side of the member 1 is substantially open to permit the insertion of the film roll and/or film cartridge.

The film holder 4 has side guides 4a, 4b, and 4c which maintain the film alignment with the sprocket holes of the sprocket 10.

The contact between the sprocket and the film occurs in the area indicated by the bracket 16. As the sprocket is rotated counter-clockwise in FIGURE 1, it engages the sprocket holes in the area 16 and rotates the film roll clockwise, moving the leading edge F1 past the guides and sprocket and into the viewing position 3. The viewing position 3 has the conventional glass viewing plates for keeping the film flat in the viewing position. Note that the sprockets only contact the film at the area 16 and does not contact the film on the upper side of the sprocket. In other words, the leading edge of the film is pushed past the guides and into the viewing position. The film is not pulled.

Sufficient leader is placed on the film so that after all the frames have been viewed there will be still some film left in the holder 4. After the film has been viewed the sprocket is then reversed and the film wound up in the holder 4.

The guide 20 is provided for stripping the leading edge of the film off the sprocket, when the film is rewound. This is only necessary in case the film has a curl in it which would cause it to come in contact with the guide 20.

In order to avoid taking the film into the hands and inserting the film in the film holder 4, it is desirable to keep the film in its own cartridge and insert the cartridge into the film holder 4.

A suitable strip film cartridge is shown in FIGURE 4. This cartridge comprises a hollow member 25 which has a large aperture 26 which is used for inserting the film and for permitting contact between the sprocket and the sprocket holes in the film in the container 25. Note that the lower tongue portion of the container 25 has a recessed portion 27 to accommodate a sprocket. The container preferably has one or more springs 28 which are adapted to contain the roll inside the container cartridge 25.

When using the cartridge of FIGURE 4, the film is not touched by the hands at all. The cartridge is merely placed inside the film holder 4. The large aperture 26 is to permit the sprocket to engage the holes in the film and the operation is similar to that as previously discussed.

Many modifications may be made by those who desire to practice the invention without departing from the scope thereof which is defined by the following claims:

We claim:
1. Self threading film strip holder means comprising,
a body member having a film viewing portion and a hollow film feeding portion,
said film viewing portion being adapted to be inserted in a slide projector,
a sprocket rotatably mounted in said body member to push film roll in said film feeding portion,
film holding means pivotally mounted in said film feeding portion of said body member and adapted to receive said film roll,
means to spring load said film holding means to press said film roll against said sprocket,
and guide means adapted to guide said film past said sprocket and into said viewing portion.

2. Self threading film strip feeding means comprising,
a body member having a film viewing portion and a hollow film feeding portion,
a sprocket rotatably mounted in said body member to push film in said film feeding portions,
film holding means pivotally mounted in said film feeding portion of said body member adapted to receive said film roll,
means to spring load said film holding means to press said film roll against said sprocket,
said film holding means being apertured to permit said sprocket to engage said film roll,
and guide means adapted to guide said film past said sprocket and into said viewing portion.

3. Self threading film strip holder means comprising,
a body member having a film viewing portion and a hollow film feeding portion,
said film viewing portion being adapted to be inserted in a slide projector,
a sprocket rotatably mounted in said body member to push a film roll in said film feeding portion,
film holding means pivotally mounted in said film feeding portion of said body member and adapted to receive said film rolls,
means to spring load said film holding means to press said film roll against said sprocket,
guide means adapted to guide said film past said sprocket and into said viewing portion,
a removable roll film holder cartridge comprising,
a hollow container adapted to fit into said film holder,
said container having a large aperture on one side thereof,
said aperture being adapted to permit said sprocket to enter said container to come into contact with the sprocket holes on said film inside said container.

References Cited

UNITED STATES PATENTS

| 2,378,406 | 6/1945 | Harris | 95—31 |
| 2,632,361 | 3/1953 | Krows | 88—28 |
| 3,066,881 | 12/1962 | Krueger | 242—55.53 |
| 3,318,548 | 5/1967 | Palmer | 242—55.13 |

FOREIGN PATENTS 228,062  9/1961  Austria.

NORTON ANSHER, *Primary Examiner.*

W. A. SIVERTSON, *Assistant Examiner.*

U.S. Cl. X.R.

226—118; 242—55; 226—76; 353—120